(12) United States Patent
Ishikawa

(10) Patent No.: US 10,280,822 B2
(45) Date of Patent: May 7, 2019

(54) EXHAUST GAS PURIFYING APPARATUS

(71) Applicant: TOYOTA JIDOSHA KABUSHIKI KAISHA, Toyota-shi, Aichi (JP)

(72) Inventor: Norio Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/021,606

(22) Filed: Jun. 28, 2018

(65) Prior Publication Data

US 2019/0017425 A1    Jan. 17, 2019

(30) Foreign Application Priority Data

Jul. 11, 2017 (JP) .................. 2017-135619
Mar. 13, 2018 (JP) .................. 2018-045821

(51) Int. Cl.
| | |
|---|---|
| *F01N 3/28* | (2006.01) |
| *B01D 53/94* | (2006.01) |
| *F01N 13/00* | (2010.01) |
| *F01N 13/16* | (2010.01) |
| *F01N 3/10* | (2006.01) |

(52) U.S. Cl.
CPC .......... *F01N 3/2803* (2013.01); *F01N 3/101* (2013.01); *F01N 13/0093* (2014.06); *F01N 13/16* (2013.01); *F01N 2260/08* (2013.01); *F01N 2330/02* (2013.01)

(58) Field of Classification Search
None
See application file for complete search history.

(56) References Cited

U.S. PATENT DOCUMENTS 6,827,909 B1 * 12/2004 Bruck .................. F01N 3/2006
422/177

FOREIGN PATENT DOCUMENTS

| JP | 2005155355 A | 6/2005 |
| JP | 2015165095 A | 9/2015 |

* cited by examiner

*Primary Examiner* — Walter D. Griffin
*Assistant Examiner* — Jelitza M Perez
(74) *Attorney, Agent, or Firm* — Oliff PLC

(57) ABSTRACT

Provided is an exhaust gas purifying apparatus including a first catalyst and a second catalyst that passes exhaust gas from the first catalyst, in which the temperature of the second catalyst can be increased in an early stage after an engine is started, and thus exhaust gas purification efficiency can be enhanced in an earlier stage than in conventional apparatuses. The apparatus includes an exhaust gas purifying catalyst that includes a first catalyst for purifying exhaust gas from an exhaust manifold and a second catalyst for purifying exhaust gas having passed through the first catalyst. The heat capacity of the first catalyst is lower than that of the second catalyst. The heat capacity of the second catalyst is 184 to 322 J/K under a temperature environment of 25° C., and that of the first catalyst is less than or equal to 20 J/K under a temperature environment of 25° C.

4 Claims, 9 Drawing Sheets

EXHAUST GAS PURIFYING APPARATUS

CROSS REFERENCE TO RELATED APPLICATIONS

The present application claims priority from Japanese patent application JP 2018-045821 filed on Mar. 13, 2018 and Japanese patent application JP 2017-135619 filed on Jul. 11, 2017, the content of which is hereby incorporated by reference into this application.

BACKGROUND

Technical Field

The present disclosure relates to an exhaust gas purifying apparatus including an exhaust gas catalyst for purifying exhaust gas from an exhaust manifold.

Background Art

Conventionally, an exhaust manifold is connected to an exhaust gas purifying apparatus for purifying exhaust gas discharged from an engine. The exhaust gas purifying apparatus includes a catalyst for purifying exhaust gas from the exhaust manifold, and the catalyst includes metal catalysts for purifying exhaust gas and a substrate (catalyst substrate) adapted to have the metal catalysts supported thereon.

As such an exhaust gas purifying apparatus, for example, JP 2015-165095 A discloses an exhaust gas purifying apparatus including a first catalyst for purifying exhaust gas from an exhaust manifold, and a second catalyst for purifying the exhaust gas having passed through the first catalyst. In the exhaust gas purifying apparatus, the heat capacity of the first catalyst is lower than that of the second catalyst. Accordingly, the temperature of the first catalyst can be increased in an early stage, and exhaust performance when the engine is started can be enhanced.

SUMMARY

However, even when the configuration of JP 2015-165095 A is used, there may be cases where, in the stage where the first catalyst is activated when the engine is started, the first catalyst absorbs an amount of heat that is greater than the amount of heat generated upon reaction of exhaust gas with the first catalyst and input to the exhaust gas passing through the first catalyst. That is, when a great amount of heat of exhaust gas is taken away by the first catalyst, the temperature of the exhaust gas having passed through the first catalyst and flowing toward the second catalyst may become lower than when the first catalyst is not provided. Consequently, it takes a longer time to activate the second catalyst after the engine is started, which results in a longer time until the predetermined purification efficiency is reached from the time of starting the engine than when the first catalyst is not provided.

The present disclosure has been made in view of the foregoing, and exemplary embodiments relate to providing an exhaust gas purifying apparatus in which even when a first catalyst and a second catalyst that passes exhaust gas from the first catalyst are provided, the temperature of the second catalyst can be increased in an early stage after an engine is started and thus exhaust gas purification efficiency can be enhanced in an earlier stage than those of the conventional apparatuses.

In view of the foregoing, the inventor has conducted concentrated studies and considered that setting the heat capacity of the first catalyst extremely lower than that of the second catalyst may be able to suppress the amount of heat of exhaust gas that is taken away by the first catalyst when exhaust gas from an exhaust manifold passes through the first catalyst. So far, it has been considered that when the heat capacity of a catalyst is set extremely low, the size of the catalyst becomes extremely small, and thus that almost zero exhaust gas purification performance will be obtained. However, as is clear from the experiments conducted by the inventor described below, a new finding has been obtained that even when the size of the first catalyst is set extremely smaller than that of the second catalyst, the first catalyst can sufficiently contribute to purifying exhaust gas.

The present disclosure is based on such new finding of the inventor, and an exhaust gas purifying apparatus of the present disclosure is an exhaust gas purifying apparatus including an exhaust gas purifying catalyst adapted to purify exhaust gas from an exhaust manifold, in which the exhaust gas purifying catalyst includes a first catalyst and a second catalyst, the first catalyst being adapted to purify exhaust gas from the exhaust manifold, and the second catalyst being adapted to purify the exhaust gas having passed through the first catalyst, the heat capacity of the first catalyst is lower than that of the second catalyst, the heat capacity of the second catalyst is 184 to 322 J/K under a temperature environment of 25° C., and the heat capacity of the first catalyst is less than or equal to 20 J/K under a temperature environment of 25° C.

According to the present disclosure, the heat capacity of the second catalyst is in the range of the heat capacity of typical catalysts used for vehicles, while the heat capacity of the first catalyst is less than or equal to 20 J/K that is extremely lower than the heat capacity of the second catalyst. Accordingly, even when exhaust gas at a relatively low temperature from an exhaust manifold passes through the first catalyst at the start of the engine, the temperature of the first catalyst increases in an early stage since the heat capacity of the first catalyst is low as described above. In addition, since the heat of exhaust gas passing through the first catalyst is difficult to be taken away by the first catalyst, the temperature of the second catalyst can also be increased in an early stage following the first catalyst due to the heat of the exhaust gas having passed through the first catalyst. Consequently, since the first catalyst is activated in an early stage after the engine is started and the second catalyst is also activated in an earlier stage than those of the conventional apparatuses, exhaust gas purification efficiency can be increased in an early stage after the engine is started.

Herein, since the heat capacity of the first catalyst is less than or equal to 20 J/K under a temperature environment of 25° C., the size of the first catalyst is significantly smaller than those of the conventional catalysts. Therefore, the first catalyst can be arranged easily without the need to newly provide a space for arranging the first catalyst. It has been found that when the heat capacity of the first catalyst is over 20 J/K, it takes a longer time to activate the second catalyst from the time of starting the engine than when the first catalyst is not provided as is clear from the results of experiments conducted by the inventor described below.

Herein, the first catalyst may be arranged in an exhaust manifold or an exhaust pipe on the upstream side of the second catalyst, for example. As a preferable aspect, the exhaust gas purifying apparatus further includes a catalytic converter, the catalytic converter including the first and second catalysts and a meal housing storing the first and second catalysts therein, the housing has an inlet-side cone portion adapted to allow exhaust gas from the exhaust manifold to flow thereinto and having an exhaust gas flow channel with a cross-section that becomes larger from an upstream side toward a downstream side of the exhaust gas, a body portion continuous with the inlet-side cone portion and having an exhaust gas flow channel with a constant cross-section, and an outlet-side cone portion continuous with the body portion and having an exhaust gas flow channel with a cross-section that becomes smaller from an upstream side toward a downstream side of exhaust gas, the first catalyst is arranged in the inlet-side cone portion, and the second catalyst is arranged in the body portion.

According to such an aspect, the second catalyst is arranged in the body portion of the housing of the catalytic converter as with the conventional catalysts. Meanwhile, since the size of the first catalyst is smaller than that of the second catalyst, the first catalyst can be arranged in an exhaust pipe or the like, but is arranged in the inlet-side cone portion in the present aspect. Accordingly, the first catalyst with a larger diameter and a shorter length along the flow channel can be arranged in the exhaust gas purifying apparatus in comparison with when the first catalyst is arranged in the exhaust pipe. Consequently, a pressure drop of exhaust gas passing through the first catalyst can be reduced.

In addition, the substrate (catalyst substrate) adapted to have metal catalysts of the first catalyst supported thereon may be either a substrate made of a ceramic material or a substrate made of a metal material, but as a more preferable aspect, the first catalyst includes a substrate made of a metal material and metal catalysts supported thereon for purifying exhaust.

For example, the specific heat of a metal material, such as stainless steel, which is used for a substrate is typically lower than that of a ceramic material, such as cordierite, which is also used for a substrate. Therefore, according to the present aspect, using a substrate made of a metal material as the substrate of the first catalyst can easily obtain the aforementioned first catalyst that satisfies the condition of the heat capacity of the first catalyst.

In addition, since the first catalyst is extremely smaller than the conventional catalysts, using a substrate made of a metal material for the first catalyst in the present aspect can avoid cracks due to thermal shocks and the like that would otherwise occur if a substrate made of a ceramic material is used. Further, when the first catalyst is arranged in the inlet-side cone portion of the metal housing of the catalytic converter, the inlet-side cone portion of the housing and the substrate of the first catalyst can be easily joined together through welding.

As a further preferable aspect, the substrate has a disk-like shape, and includes an outer peripheral portion, an inner peripheral portion formed on the inner side of the outer peripheral portion, a first gas passage portion having a plurality of pores formed between the outer peripheral portion and the inner peripheral portion along the exhaust gas flow direction, a wall surface forming each pore being adapted to have the metal catalysts supported thereon, a second gas passage portion that is a cavity portion formed on the inner side of the inner peripheral portion along the exhaust gas flow direction, and the proportion of the cross-sectional area of an exhaust gas flow channel of the second gas passage portion to the total cross-sectional area of the cross-sectional area of an exhaust gas flow channel of the first gas passage portion and the cross-sectional area of the exhaust gas flow channel of the second gas passage portion is 3.5 to 25%.

According to such an aspect, the velocity of exhaust gas flowing toward the first catalyst is high at the center, and the second gas passage portion is located at that position. Since the first gas passage portion has a plurality of pore pores formed therein, and the second gas passage portion is the cavity portion, a pressure drop of exhaust gas in the second gas passage portion is smaller than that in the first gas passage portion, and thus the exhaust gas can easily flow through the second gas passage portion. Consequently, the flow velocity of exhaust gas flowing through the second gas passage portion can be increased while the flow rate thereof is ensured, and thus the exhaust gas can flow into the central portion of the second catalyst. Accordingly, the temperature of the central portion of the second catalyst is increased in an early stage, and the heat of the temperature increase is uniformly transmitted to the peripheral portion from the central portion, and thus the second catalyst can be activated in an early stage and the temperature thereof can be increased in an early stage. It should be noted that when exhaust gas passes through the first gas passage portion, the temperature of the first gas passage portion is increased, and the heat of the temperature increase is transmitted to the exhaust gas passing through the second gas passage portion.

Herein, if the aforementioned proportion of the cross-sectional area is less than 3.5%, the flow rate of exhaust gas flowing through the second gas passage portion becomes lower. Therefore, in such a case, the effect of increasing the temperature of the second catalyst may not be fully expected. Meanwhile, if the proportion of the cross-sectional area is over 25%, the flow rate of exhaust gas flowing through the first gas passage portion of the first catalyst becomes lower. Therefore, the effect of increasing the temperature of the first catalyst would decrease. Accordingly, the effect of increasing the temperature of the second catalyst may not be fully expected.

According to the present disclosure, even when a first catalyst and a second catalyst that passes exhaust gas from the first catalyst are provided, the temperature of the second catalyst can be increased in an early stage after an engine is started, and thus exhaust gas purification efficiency can be enhanced in an earlier stage than those of the conventional apparatuses.

DETAILED DESCRIPTION

First Embodiment

Figure 1:
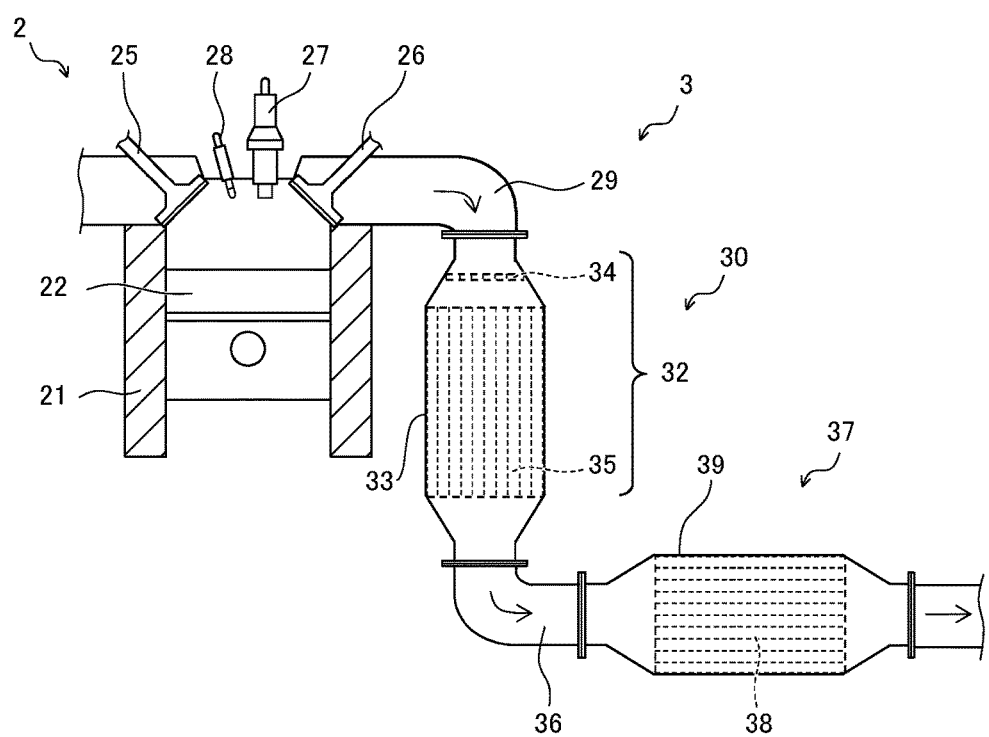
FIG. 1 is a schematic conceptual view illustrating an exhaust gas purifying apparatus in accordance with a first embodiment of the present disclosure.
Figure 2:
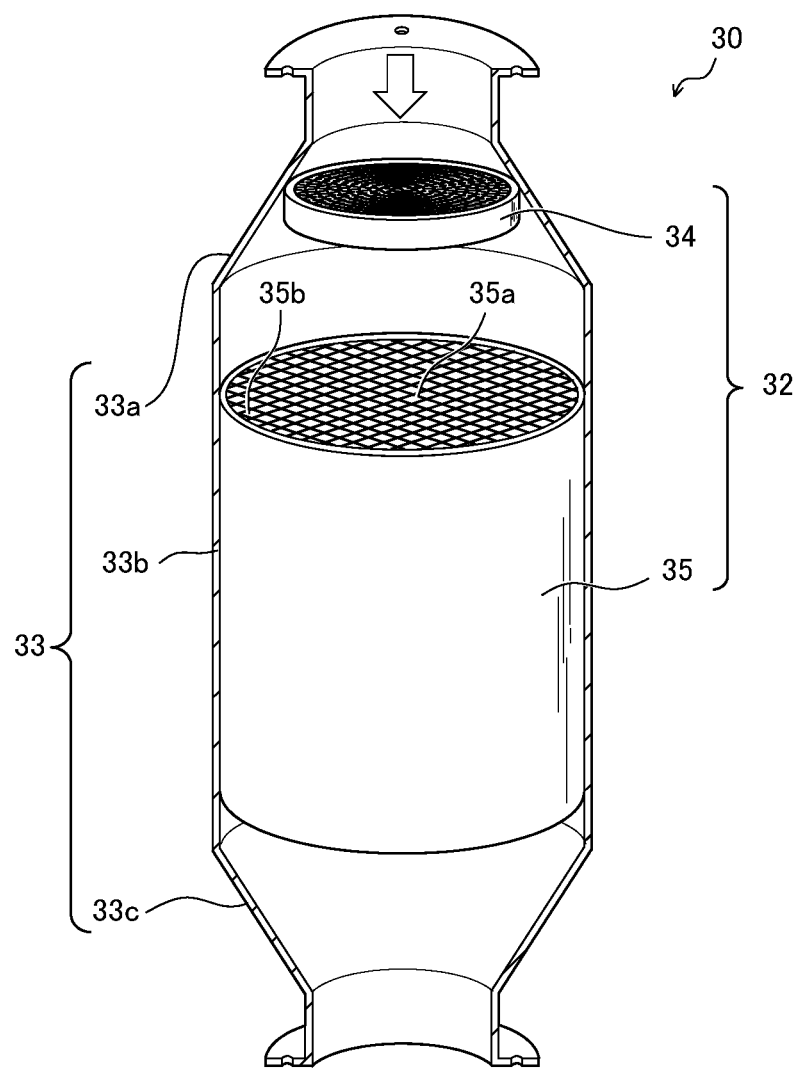
FIG. 2 is a schematic perspective view of a first catalytic converter of the exhaust gas purifying apparatus illustrated in FIG. 1.

Hereinafter, an exhaust gas purifying apparatus in accordance with the first embodiment of the present disclosure will be described with reference to FIGS. 1 and 2. FIG. 1 is a schematic conceptual view illustrating an exhaust gas purifying apparatus 3 in accordance with an embodiment of the present disclosure. FIG. 2 is a schematic perspective view of a first catalytic converter 30 of the exhaust gas purifying apparatus 3 illustrated in FIG. 1. It should be noted that in FIG. 2, a housing 33 is illustrated in a half-split state to clearly show the inside of the first catalytic converter 30.

As illustrated in FIG. 1, the exhaust gas purifying apparatus 3 in accordance with this embodiment is an apparatus attached to the downstream side of an engine 2 for purifying exhaust gas generated through combustion processes in the engine 2. The engine 2 may be either a gasoline engine or a diesel engine. In this embodiment, a gasoline direct injection engine is exemplarily illustrated in FIG. 1.

In the engine 2, air taken via an intake valve 25 flows into a combustion chamber formed of a cylinder block 21 and a piston 22, and is mixed with fuel (gasoline) injected by a fuel injection valve 28. The resulting air-fuel mixture is ignited by an ignition plug 27 and burned in the combustion chamber, and exhaust gas generated thereby is discharged from an exhaust manifold 29 via an exhaust valve 26.

The exhaust gas discharged through the exhaust manifold 29 is purified by the exhaust gas purifying apparatus 3. Specifically, the exhaust gas purifying apparatus 3 includes the first catalytic converter 30 connected to the exhaust manifold 29, and a second catalytic converter 37 connected to the first catalytic converter 30 on the downstream side thereof via an exhaust pipe 36. The first catalytic converter 30 is arranged in an engine room (not illustrated) of a vehicle, for example, and the second catalytic converter 37 is arranged under the floor (not illustrated) of the vehicle, for example.

The first catalytic converter 30 includes an exhaust gas purifying catalyst 32 for purifying exhaust gas from the exhaust manifold 29, and a housing 33 storing the exhaust gas purifying catalyst 32 therein. Similarly, the second catalytic converter 37 includes an exhaust gas purifying catalyst 38 for further purifying exhaust gas that has not been completely purified by the first catalytic converter 30, and a housing 39 storing the exhaust gas purifying catalyst 38 therein. Each of the housings 33, 39 is made of a metal material, such as stainless steel, carbon steel, or aluminum.

As illustrated in FIG. 2, the housing 33 of the first catalytic converter 30 has formed therein an inlet-side cone portion 33a, a body portion 33b, and an outlet-side cone portion 33c. The inlet-side cone portion 33a has a cone shape that allows exhaust gas from the exhaust manifold 29 to flow thereinto and in which the cross-section of an exhaust gas flow channel becomes larger from the upstream side toward the downstream side of the exhaust gas. The body portion 33b is formed continuously with the inlet-side cone portion 33a on the upstream side of the exhaust gas and has a cylindrical shape in which the cross-section of an exhaust gas flow channel is constant. The outlet-side cone portion 33c is formed continuously with the body portion 33b on the upstream side of the exhaust gas, and has a cone shape in which the cross-section of an exhaust gas flow channel becomes smaller from the upstream side toward the downstream side of the exhaust gas.

In this embodiment, the exhaust gas purifying catalyst 32 of the first catalytic converter 30 includes a first catalyst 34 for purifying exhaust gas from the exhaust manifold 29, and a second catalyst 35 for purifying exhaust gas that has passed through the first catalyst 34. The first catalyst 34 is arranged in the inlet-side cone portion 33a, and the second catalyst 35 is arranged in the body portion 33b.

In this embodiment, since the engine 2 is a gasoline engine, each of the first catalyst 34 and the second catalyst 35 is a three-way catalyst for purifying hydrocarbon (HC), carbon monoxide (CO), and nitrided oxide ($NO_x$) in exhaust gas of the gasoline engine. Meanwhile, when the internal combustion engine is a diesel engine, each of the first catalyst 34 and the second catalyst 35 is an oxidation catalyst for removing carbon monoxide (CO), hydrocarbon (HC), and the like. It should be noted that for the exhaust gas purifying catalyst 38 stored in the second catalytic converter 37, similar catalysts to the first and second catalysts 34, 35 are provided in accordance with the type of the internal combustion engine.

Each of the first catalyst 34 and the second catalyst 35 includes a substrate (catalyst substrate) and metal catalysts supported thereon for purifying exhaust gas. Such a substrate may be made of either a ceramic material or a metal material, but preferably, a metal material is used. As the metal material, a heat-resistant and corrosion-resistant material is preferably used, and for example, stainless steel, aluminum, or the like can be used.

Herein, the specific heat of a metal material, such as stainless steel, which is a material of a substrate, is lower than that of a ceramic material, such as cordierite, which is also a material of a substrate, for example. Accordingly, using a substrate made of a metal material for the substrate of the first catalyst 34 can easily produce a catalyst that satisfies the condition of the heat capacity of the first catalyst 34 described below. In addition, since the first catalyst 34 satisfies the condition of extremely low heat capacity as described below, using a substrate made of a metal material for the first catalyst 34 can avoid cracks due to thermal shocks and the like that would otherwise occur if a substrate made of a ceramic material is used.

Figure 3:
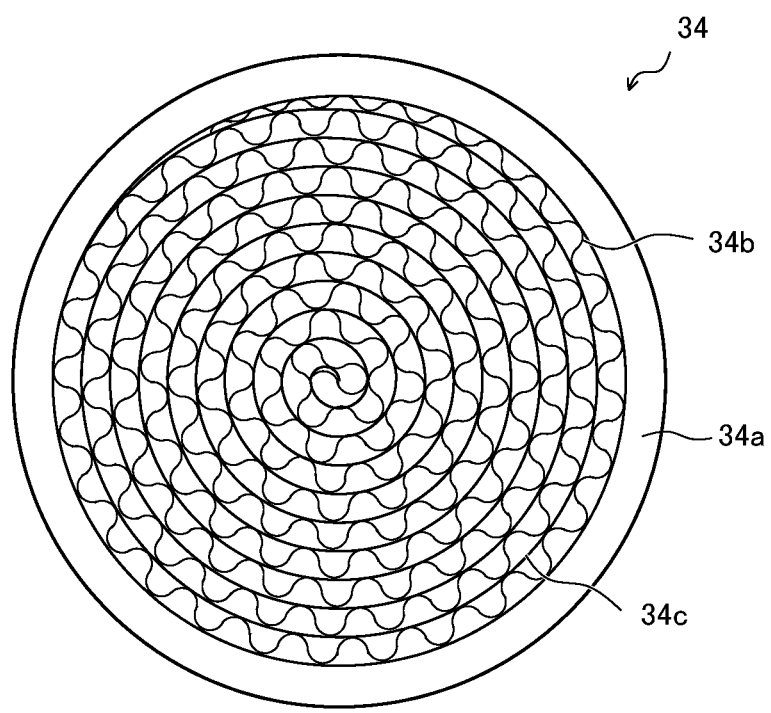
FIG. 3 is a schematic plan view of the first catalyst illustrated in FIG. 2.

As illustrated in FIGS. 2 and 3, the substrate of the first catalyst 34 is a disk-like structure having a ring-like metal frame (outer peripheral portion) 34a and a plurality of cells (pores) formed therein to pass exhaust gas. Specifically, the first catalyst 34 has a plurality of cells, which is formed by winding a metal band 34b bent in a wavy shape and a plate-like metal band 34c while overlaying one on top of the other, within the metal frame 34a.

Meanwhile, in this embodiment, the substrate of the second catalyst 35 is a cylindrical substrate made of a ceramic material with a structure having formed therein a plurality of cells to pass exhaust gas. As the ceramic material, a porous ceramic material including one of alumina, zirconia, cordierite, titania, silicon carbide, or silicon nitride as a main component can be used, for example. The same is true of the substrate of the exhaust gas purifying catalyst 38.

Each of the metal catalysts of the first catalyst 34 and the second catalyst 35 is granular, and is supported on the inner wall surface forming each cell with a ceramic material interposed therebetween. For metal of the metal catalysts, noble metal including at least one of platinum, rhodium, or palladium is selected. As the ceramic material for supporting the metal catalysts on the substrate, a mixed material of zirconia and alumina; ceria and alumina; ceria-zirconia and alumina; or the like can be used. When the metal catalysts are supported on the substrate, the substrate may be coated with slurry containing the aforementioned ceramic material and the metal catalyst, and then baked.

In this embodiment, the heat capacity of the first catalyst 34 is lower than that of the second catalyst 35. Specifically, the heat capacity of the first catalyst 34 is less than or equal to 20 J/K under a temperature environment of 25° C., and the heat capacity of the second catalyst 35 is 184 to 322 J/K under a temperature environment of 25° C.

It should be noted that the range of the heat capacity of the second catalyst 35 is the heat capacity of a catalyst that is applied in accordance with the engine displacement of the commercial available vehicles. Therefore, appropriately using the aforementioned material and the like can satisfy such a range of the heat capacity. If the heat capacity of the second catalyst 35 is less than 184 J/K, the size (heat capacity) of the second catalyst 35 is too small. Therefore, sufficient exhaust gas purification performance cannot be obtained. Meanwhile, if the heat capacity of the second catalyst 35 is over 322 J/K, the size (heat capacity) of the second catalyst 35 is too large. Therefore, a temperature increase of the second catalyst 35 due to exhaust gas after the engine is started is small.

According to this embodiment, the heat capacity of the first catalyst 34 is less than or equal to 20 J/K that is extremely lower than the heat capacity of the second catalyst 35. Therefore, even when exhaust gas at a relatively low temperature from the exhaust manifold 29 passes through the first catalyst 34 at the start of the engine 2, since the heat capacity of the first catalyst 34 is low as described above, the temperature of the first catalyst 34 is increased in an earlier stage than those of the conventional catalysts.

In addition, since the heat capacity of the first catalyst 34 is low, the heat of exhaust gas passing through the first catalyst 34 is difficult to be taken away by the first catalyst 34, and thus heat generated upon reaction of the exhaust gas with the metal catalysts is added to the heat of the exhaust gas passing through the first catalyst 34. Therefore, the temperature of the second catalyst 35 can also be increased in an early stage following the first catalyst 34 due to the heat of the exhaust gas having passed through the first catalyst 34 after the engine 2 is started. Consequently, the first catalyst 34 is activated in an early stage after the engine 2 is started, and the second catalyst 35 is also activated in an earlier stage than those of the conventional catalysts, so that exhaust gas purification efficiency can be enhanced in an early stage. Further, since the metal catalysts of the first catalyst 34 play a part in the purification of exhaust gas, the heat of reaction of the metal catalysts of the second catalyst 35 can be suppressed in comparison with when the first catalyst 34 is not provided. Consequently, deterioration of the metal catalysts of the second catalyst 35 can be suppressed.

If the heat capacity of the first catalyst 34 is over 20 J/K, it takes a longer time to activate the second catalyst 35 from the time of starting the engine 2 than when the first catalyst 34 is not provided. It should be noted that the heat capacity of the first catalyst 34 is preferably greater than or equal to 3 J/K from a perspective of the production.

Further, since the heat capacity of the first catalyst 34 is less than or equal to 20 J/K under a temperature environment of 25° C., the size of the first catalyst is far smaller than those of the typical conventional catalysts. Therefore, the first catalyst 34 can be arranged easily without the need to newly provide a space for arranging the first catalyst 34.

In particular, in this embodiment, the second catalyst 35 is arranged in the body portion 33b of the housing 33 of the first catalytic converter 30 as with the conventional catalysts, and the first catalyst 34 is arranged in the inlet-side cone portion 33a. Accordingly, the first catalyst with a larger diameter and a smaller length along the exhaust gas flow channel can be arranged in comparison with when the first catalyst 34 is arranged in an exhaust pipe. Consequently, a pressure drop of exhaust gas passing through the first catalyst 34 can be reduced.

In addition, since the exhaust gas passing through the first catalyst 34 is rectified on the upstream side of the second catalyst 35, the velocity gradient of the exhaust gas flowing toward the second catalyst 35 can be made moderate, and thus the velocity distribution of the exhaust gas can be made smooth.

As described above, the substrate of the first catalyst 34 is made of a metal material. Accordingly, when the first catalyst 34 is arranged in the inlet-side cone portion 33a of the metal housing 33, the inlet-side cone portion 33a and the substrate of the first catalyst 34 can be easily joined together through welding.

Second Embodiment

Figure 4:
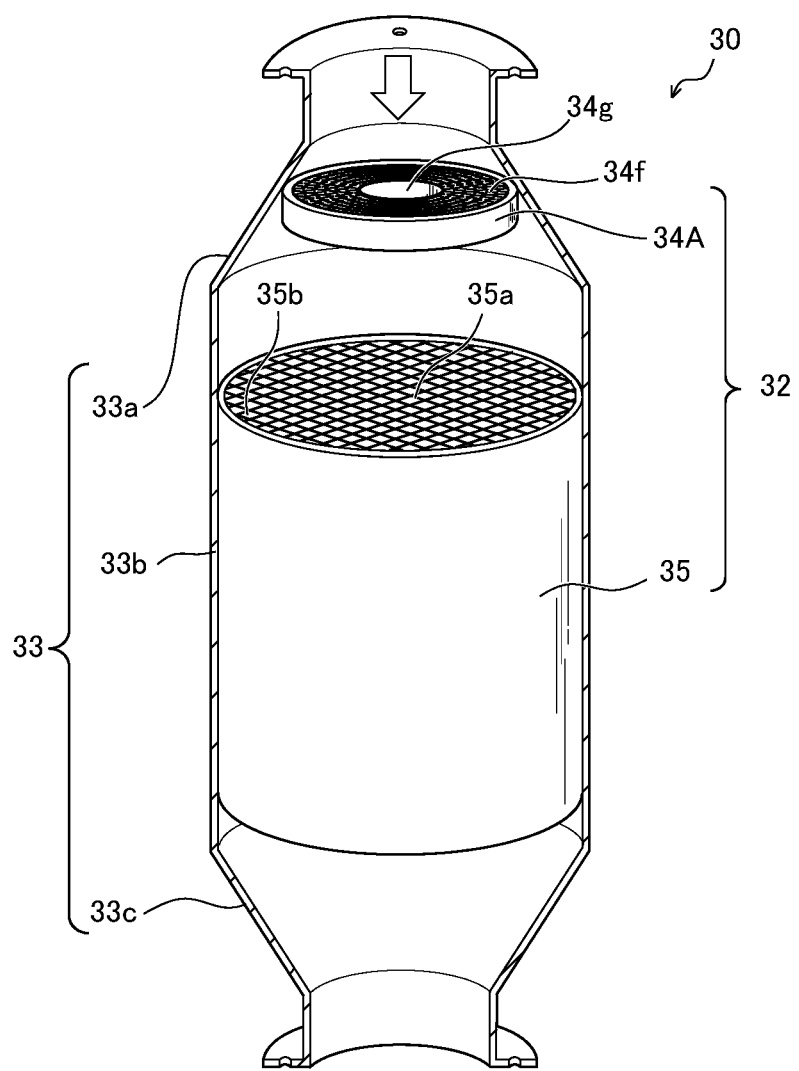
FIG. 4 is a schematic conceptual view for illustrating an exhaust gas purifying apparatus in accordance with a second embodiment of the present disclosure.
Figure 5:
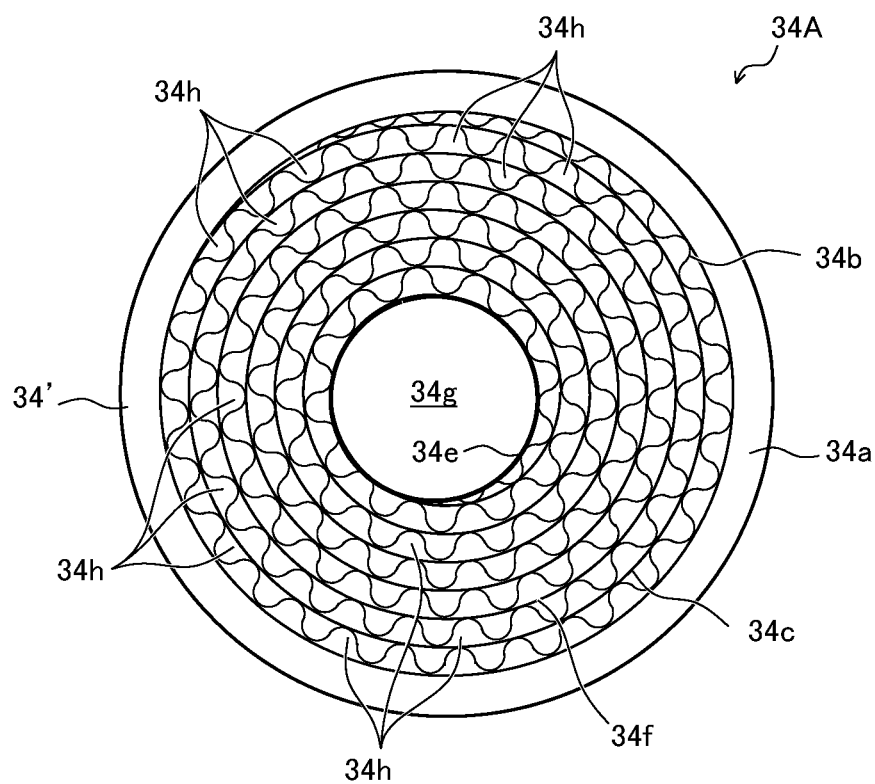
FIG. 5 is a schematic plan view of the first catalyst illustrated in FIG. 4.

FIG. 4 is a schematic conceptual view for illustrating an exhaust gas purifying apparatus in accordance with a second embodiment of the present disclosure. FIG. 5 is a schematic plan view of a first catalyst 34A illustrated in FIG. 4. The exhaust gas purifying apparatus in accordance with the second embodiment differs from that in the first embodiment in the shape of the first catalyst 34A. Therefore, other members having the same functions as those of the catalyst purifying apparatus in accordance with the first embodiment are denoted by the same reference numerals, and the detailed description thereof will be omitted.

The first catalyst 34A in accordance with the second embodiment has a substrate (catalyst substrate) 34' made of the aforementioned metal material and has supported thereon metal catalysts for purifying exhaust gas. The substrate 34' has a disk-like shape, and includes a metal frame (outer peripheral portion) 34a and a ring-like inner peripheral portion 34e formed on the inner side of the metal frame 34a. The first catalyst 34A further includes a first gas passage portion 34f and a second gas passage portion 34g.

The first gas passage portion 34f is formed between the metal frame 34a and the inner peripheral portion 34e, and has a plurality of cells (pores) 34h, 34h . . . formed therein. Specifically, the plurality of cells 34h are formed by winding a metal band 34b bent in a wavy shape and a plate-like metal band 34c while overlaying one on top of the other as in the first embodiment. As in the first embodiment, each cell 34h is formed along the exhaust gas flow direction, and each cell 34h has supported thereon the metal catalysts illustrated in the first embodiment.

The second gas passage portion 34g is a cavity portion formed on the inner side of the inner peripheral portion 34e along the exhaust gas flow direction, and the first gas passage portion 34f and the second gas passage portion 34g are separated by the inner peripheral portion 34e. In addition, as illustrated in FIG. 5, the second gas passage portion 34g is arranged at a position opposite a central portion 35a of the second catalyst 35.

In this embodiment, the proportion of the cross-sectional area of the exhaust gas flow channel of the second gas passage portion 34g to the total sum of the cross-sectional area of the exhaust gas flow channel of the first gas passage portion 34f and the cross-sectional area of the exhaust gas flow channel of the second gas passage portion 34g is 3.5 to 25%.

It should be noted that the exhaust gas flow channel of the first gas passage portion 34f corresponds to the plurality of cells 34h, and the cross-sectional area of the flow channel is the total area of the plurality of cells 34h on a virtual cross-section that is orthogonal to the exhaust gas flow direction. Specifically, the cross-sectional area is an area obtained by subtracting the cross-sectional areas of the metal band 34b and the plate-like metal band 34c from the area of the region surrounded by the metal frame 34a and the inner peripheral portion 34e in the plan view illustrated in FIG. 5.

Meanwhile, the exhaust gas flow channel of the second gas passage portion 34g is the very cavity portion, and the cross-sectional area of the flow channel is the area of the cavity portion on a virtual cross-section that is orthogonal to the exhaust gas flow direction. Specifically, the cross-sectional area is the area of a region surrounded by the inner peripheral portion 34e in the plan view illustrated in FIG. 5.

According to the second embodiment, the axis of the disk-like first catalyst 34A coincides with the axis of the cylindrical second catalyst 35, and as illustrated in FIG. 4, the velocity of exhaust gas flowing toward the first catalyst 34A is high at the center, and the second gas passage portion 34g is located at that position. Since the first gas passage portion 34f is formed of the plurality of pore cells (pores) 34h, 34h, . . . , and the second gas passage portion 34g is the cavity portion, a pressure drop of exhaust gas in the second gas passage portion 34g is smaller than that in the first gas passage portion 34f, and thus the exhaust gas can easily flow through the second gas passage portion 34g.

Consequently, the flow velocity of exhaust gas flowing through the second gas passage portion 34g can be increased while the flow rate thereof is ensured, and thus the exhaust gas can flow into the central portion 35a of the second catalyst 35. Accordingly, the temperature of the central portion 35a of the second catalyst 35 is increased in an early stage, and the heat of the temperature increase is uniformly transmitted to an outer peripheral portion 35b from the central portion 35a, and thus the second catalyst 35 can be activated in an early stage and the temperature thereof can be increased in an early stage. It should be noted that as exhaust gas also passes through the first gas passage portion 34f, the metal catalysts of the first gas passage portion 34f are activated by the exhaust gas. Therefore, the temperature of the first gas passage portion 34f is increased, and the heat of the temperature increase is transmitted to the exhaust gas passing through the second gas passage portion 34g.

In particular, in this embodiment, setting the aforementioned proportion of the cross-sectional area in the aforementioned range can activate the second catalyst 35 in an early stage and can thus increase the temperature thereof. If the proportion of the cross-sectional area is less than 3.5%, the flow rate of exhaust gas flowing through the second gas passage portion 34g of the first catalyst 34A becomes low as is clear from the experiments conducted by the inventor described below, and thus the effect of increasing the temperature of the second catalyst 35 may not be fully expected. Meanwhile, if the proportion of the cross-sectional area is over 25%, the flow rate of exhaust gas flowing through the first gas passage portion 34f of the first catalyst 34A becomes low, and thus the effect of increasing the temperature of the first catalyst 34A would decrease. In such a case also, the effect of increasing the temperature of the second catalyst 35 may not be fully expected.

EXAMPLES

Hereinafter, examples of the present disclosure will be described.

Example 1

As illustrated below, the first catalytic converter 30 illustrated in FIG. 2 was produced. First, a substrate in the shape illustrated in FIG. 3 was prepared as the substrate (metal substrate) of the first catalyst 34. Specifically, the substrate of the first catalyst 34 was a disk-like substrate made of stainless steel (metal substrate) with a diameter of 80 mm and a length of 2 mm, the thickness of the ring-like metal frame (outer peripheral portion) 34a was 1.0 mm, the thickness of each of the wave-like metal band 34b and the plate-like metal band 34c was 30 μm, the number of cells per square inch was 600, and the weight of the substrate was 11.5 g.

Next, as metal catalysts, the substrate was coated with slurry of ceria-zirconia containing a predetermined percentage of rhodium particles, and was then dried at 120° C. and baked at 500° C. Accordingly, substrate was covered with a coat layer with a weight of 1.3 g, and the weight of rhodium therein was about 0.1 g.

The heat capacity of the obtained first catalyst 34 was calculated from the weights of the substrate and the coat layer as well as the specific heat of each material. The specific heat of stainless steel, which is a material of the substrate, is 0.46 J/g·K under a temperature environment of 25° C., and the specific heat of the baked ceria-zirconia contained in the coat layer is 0.77 J/g·K under a temperature environment of 25° C. Therefore, the heat capacity of the first catalyst 34 of Example 1 was found to be 6.3 J/K under a temperature environment of 25° C. It should be noted that the heat capacity of rhodium was not taken into consideration since the content of rhodium in the first catalyst 34 was very small.

Next, as the second catalyst 35, a ceramic substrate made of cordierite with a diameter of 103 mm was coated with slurry of ceria-zirconia containing platinum and rhodium particles as a substrate, and was then dried and baked as with the first catalyst. The second catalyst 35 contained 1.8 g of granular platinum and 0.2 g of granular rhodium as the metal catalysts. It should be noted that the heat capacity of the second catalyst 35 was calculated as with the first catalyst 34. Then, the heat capacity of the second catalyst 35 was found to be 322 J/K under a temperature environment of 25° C.

Next, the first catalyst 34 was welded to the inlet-side cone portion 33a of the housing 33, and thereafter, the body portion 33b was welded to the inlet-side cone portion 33a, and the second catalyst 35 was fixed to the body portion 33b using Aron Ceramic (registered trademark). Finally, the outlet-side cone portion 33c was welded to the body portion 33b. Accordingly, the first catalytic converter 30 in accordance with Example 1 was obtained.

Example 2

Figure 6A:
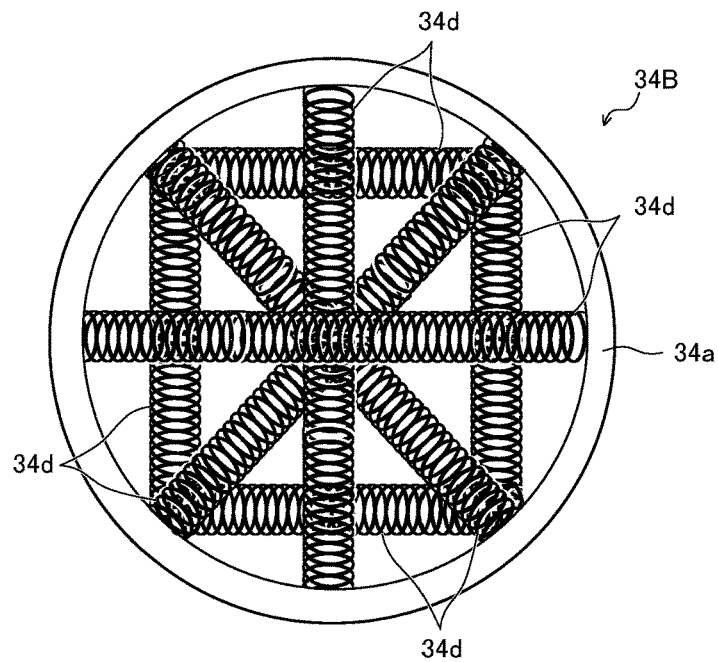
FIG. 6A is a schematic plan view of the first catalyst of Example 2 and Example 3.

A first catalytic converter was produced as in Example 1. The first catalytic converter of Example 2 differs from that of Example 1 in that a first catalyst 34B illustrated in FIG. 6A was used. Specifically, the substrate (metal substrate) of the first catalyst 34B was a disk-like substrate made of stainless steel (metal substrate) with a diameter of 80 mm and a length of 10 mm, and the thickness of the ring-like metal frame (outer peripheral portion) 34a was 1.0 mm. Next, a wire of stainless steel with a total length of 500 mm and a diameter of 0.12 mm was machined into a coil with a diameter of 5 mm, and a total of 8 coils 34d each obtained by overlaying five such coils were produced, and then, the coils 34d were fixed within the metal frame (outer peripheral portion) 34a as illustrated in FIG. 6A so as to be used as the substrate of the first catalyst of Example 2. The weight of the substrate was 20.3 g.

As in Example 1, the substrate was coated with slurry containing a predetermined percentage of rhodium, and was then dried at 120° C. and baked at 500° C. Accordingly, a coat layer with a weight of 3.0 g was formed on the substrate, and the weight of rhodium therein was about 0.1 g. The heat capacity of the obtained first catalyst 34B was calculated from the weights of the substrate and the coat layer as in Example 1. Then, the heat capacity of the first catalyst 34B of Example 2 was found to be 11.7 J/K under a temperature environment of 25° C.

Example 3

A first catalytic converter was produced as in Example 1. The first catalytic converter of Example 3 differs from that of Example 1 in that the first catalyst 34B illustrated in FIG. 6A was used, and the first catalyst of Example 3 was a catalyst with a similar shape to that of Example 2. Specifically, the substrate (metal substrate) of the first catalyst 34B was a disk-like substrate made of stainless steel (metal substrate) with a diameter of 70 mm and a length of 10 mm, and the thickness of the ring-like metal frame 34a (outer peripheral portion) was 1.0 mm. Next, as in Example 2, a wire made of stainless steel with a total length of 500 mm and a diameter of 0.12 mm was machined into a coil with a diameter of 5 mm, and a total of 8 coils 34d each obtained by overlaying five such coils were produced, and then, the coils 34d were fixed within the metal frame (outer peripheral portion) 34a so as to be used as the substrate of the first catalyst of Example 3. The weight of the substrate was 17.8 g.

As in Example 1, the substrate was coated with slurry containing a predetermined percentage of rhodium, and was then dried at 120° C. and baked at 500° C. Accordingly, a coat layer with a weight of 2.6 g was formed on the substrate, and the weight of rhodium therein was about 0.1 g. The heat capacity of the obtained first catalyst 34B was calculated from the weights of the substrate and the coat layer as in Example 1. The heat capacity of the first catalyst 34B of Example 3 was found to be 10.2 J/K under a temperature environment of 25° C.

Example 4

Figure 6B:
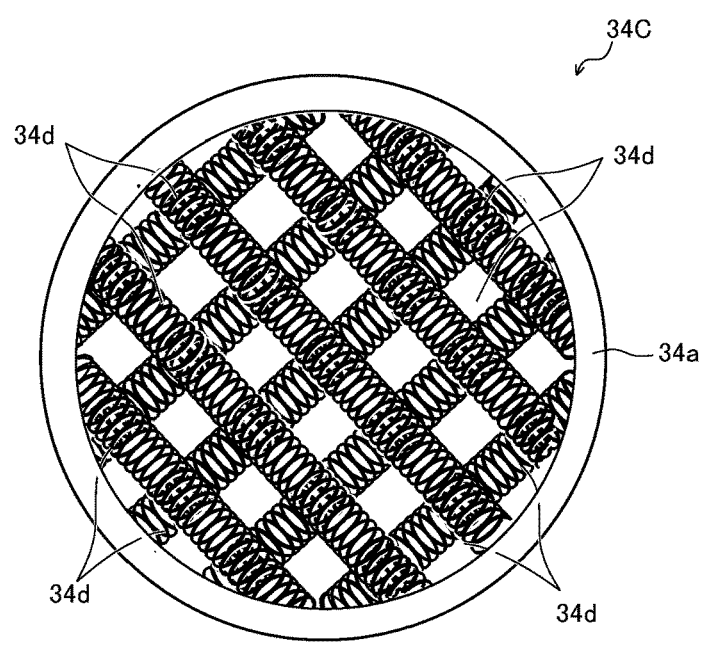
FIG. 6B is a schematic plan view of the first catalyst of Example 4.

A first catalytic converter was produced as in Example 1. The first catalytic converter of Example 4 differs from that of Example 1 in that a first catalyst 34C illustrated in FIG. 6B was used. Specifically, the substrate (metal substrate) of the first catalyst 34C was a disk-like substrate made of stainless steel (metal substrate) with a diameter of 80 mm and a length of 10 mm, and the thickness of the ring-like metal frame (outer peripheral portion) 34a was 1.0 mm. Next, as in Example 2, a wire made of stainless steel with a total length of 500 mm and a diameter of 0.12 mm was machined into a coil with a diameter of 5 mm, and a total of 10 coils 34d each obtained by overlaying five such coils were produced, and then, the coils 34d were fixed within the metal frame (outer peripheral portion) 34a so as to be used as the substrate of the first catalyst of Example 4. The weight of the substrate was 20.3 g.

As in Example 1, the substrate was coated with slurry containing a predetermined percentage of rhodium, and was then dried at 120° C. and baked at 500° C. Accordingly, a coat layer with a weight of 2.8 g was formed on the substrate, and the weight of rhodium therein was about 0.1 g.

The heat capacity of the obtained first catalyst 34C was calculated form the weights of the substrate and the coat layer as in Example 1. Then, the heat capacity of the first catalyst 34C of Example 4 was found to be 11.5 J/K under a temperature environment of 25° C.

Comparative Example 1

A first catalytic converter was produced as in Example 1. Comparative Example 1 differs from Example 1 in that the first catalyst was not provided in the first catalytic converter.

Comparative Example 2

A first catalytic converter was produced as in Example 1. The first catalytic converter of Comparative Example 2 differs from that of Example 1 in that the length of the substrate illustrated in FIG. 3 was set to 10 mm, but the other structures of the substrate were the same. The weight of the substrate was 41.2 g.

The substrate was coated with similar slurry to that of Example 1, and was then dried at 120° C. and baked at 500° C. Accordingly, a coat layer with a weight of 4.7 g was formed on the substrate, and the weight of rhodium therein was about 0.1 g. The heat capacity of the obtained first catalyst was calculated from the weights of the substrate and the coat layer as in Example 1. Then, the heat capacity of the first catalyst of Comparative Example 2 was found to be 22.7 J/K under a temperature environment of 25° C.

Comparative Example 3

A first catalytic converter was produced as in Example 1. The first catalytic converter of Comparative Example 3 differs from that of Example 2 in the structure of the first catalyst. A ring-like metal frame made of stainless steel with a diameter of 80 mm, a length of 10 mm, and a thickness of 1.0 mm was prepared. Next, a cylindrical body with a diameter of 78 mm and a length of 10 mm was cut out of a portion having formed therein cells of a substrate of a second catalyst, and then, the cut-out cylindrical body was inserted into a ring-like metal frame and fixed thereto using Aron Ceramic so as to be used as the substrate of Comparative Example 3.

The substrate was coated with similar slurry to that of Example 1, and was then dried at 120° C. and baked at 500° C. Accordingly, a coat layer was formed on the substrate, and the weight of rhodium therein was about 0.3 g. The heat capacity of the obtained first catalyst was calculated from the weights of the substrate and the coat layer as in Example 1. Then, the heat capacity of the first catalyst of Comparative Example 3 was found to be 28.8 J/K under a temperature environment of 25° C.

[Evaluation Test]

Figure 7:
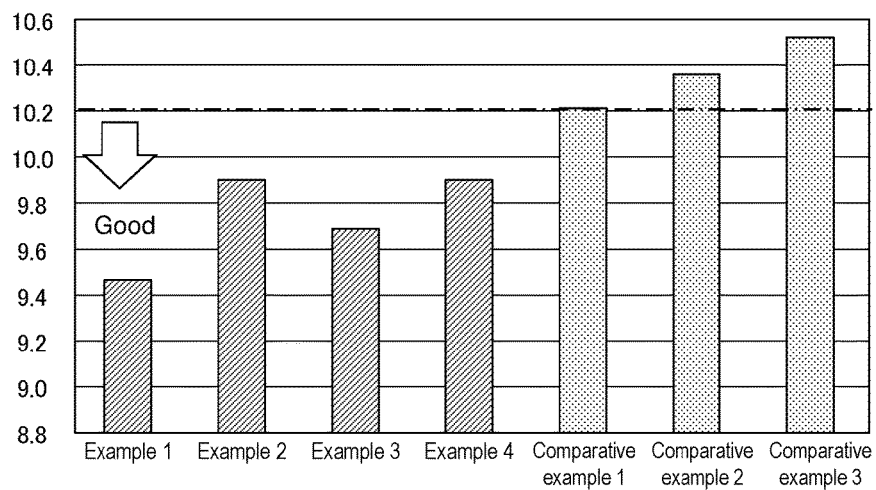
FIG. 7 is a graph illustrating the time to reach 50% purification of HC of exhaust gas having passed through the first catalytic converter in accordance with each of Examples 1 to 4 and Comparative Examples 1 to 3.
Figure 8:
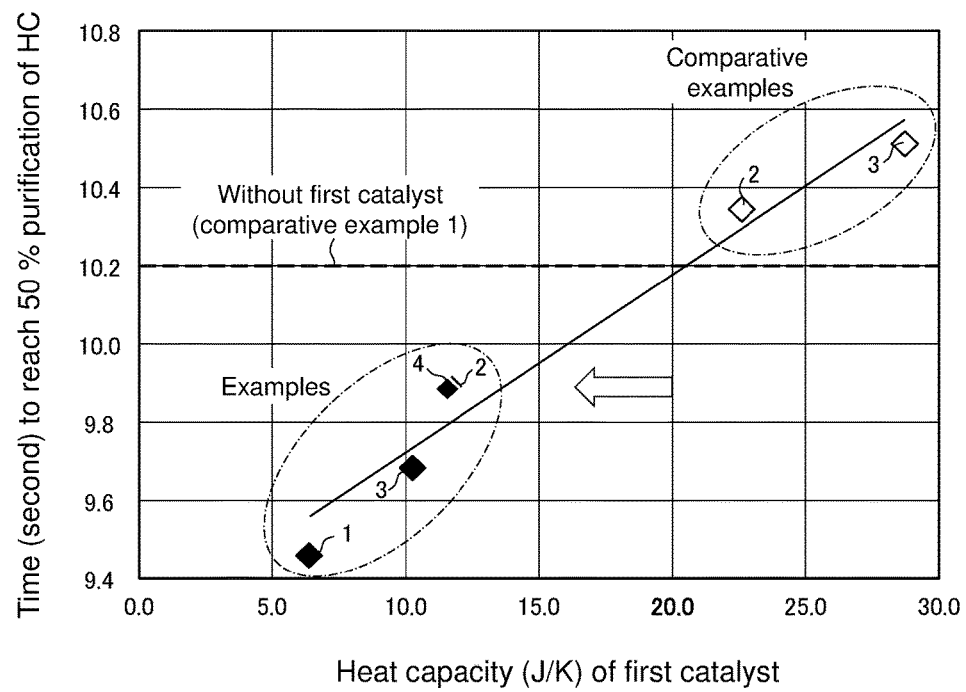
FIG. 8 is a graph illustrating the relationship between the heat capacity of the first catalyst of each of Examples 1 to 4 and Comparative Examples 1 to 3 and the time to reach 50% purification of HC of exhaust gas having passed through the first catalytic converter.

The first catalytic converter of each of Examples 1 to 4 and Comparative Examples 1 to 3 was connected to an exhaust pipe with a bypass pathway from an engine. An air-fuel mixture was burned in the engine with the amount of intake air in the engine (which corresponds to the amount of exhaust gas) set to 25 g/second under the stoichiometric condition, and exhaust gas with a temperature adjusted to 450° C. was flowed into the exhaust pipe. After that, the flow channel was switched to the bypass pathway so as to allow the exhaust gas flowing through the exhaust pipe to circulate through the bypass pathway, and thus allow the exhaust gas to pass through the first catalytic converter. The time until the purification efficiency of HC of exhaust gas discharged from the first catalytic converter reached 50% from the time of starting the engine was measured. FIGS. 7 and 8 illustrate the results. It should be noted that in the evaluation test, the timing when the flow channel was switched to the bypass pathway was assumed to be the time when the engine was started.

FIG. 7 is a graph illustrating the time to reach 50% purification of HC of exhaust gas having passed through the first catalytic converter in accordance with each of Examples 1 to 4 and Comparative Examples 1 to 3. FIG. 8 is a graph illustrating the relationship between the heat capacity of the first catalyst of each of Examples 1 to 4 and Comparative Examples 1 to 3 and the time to reach 50% purification of HC of exhaust gas having passed through the first catalytic converter.

Figure 9:
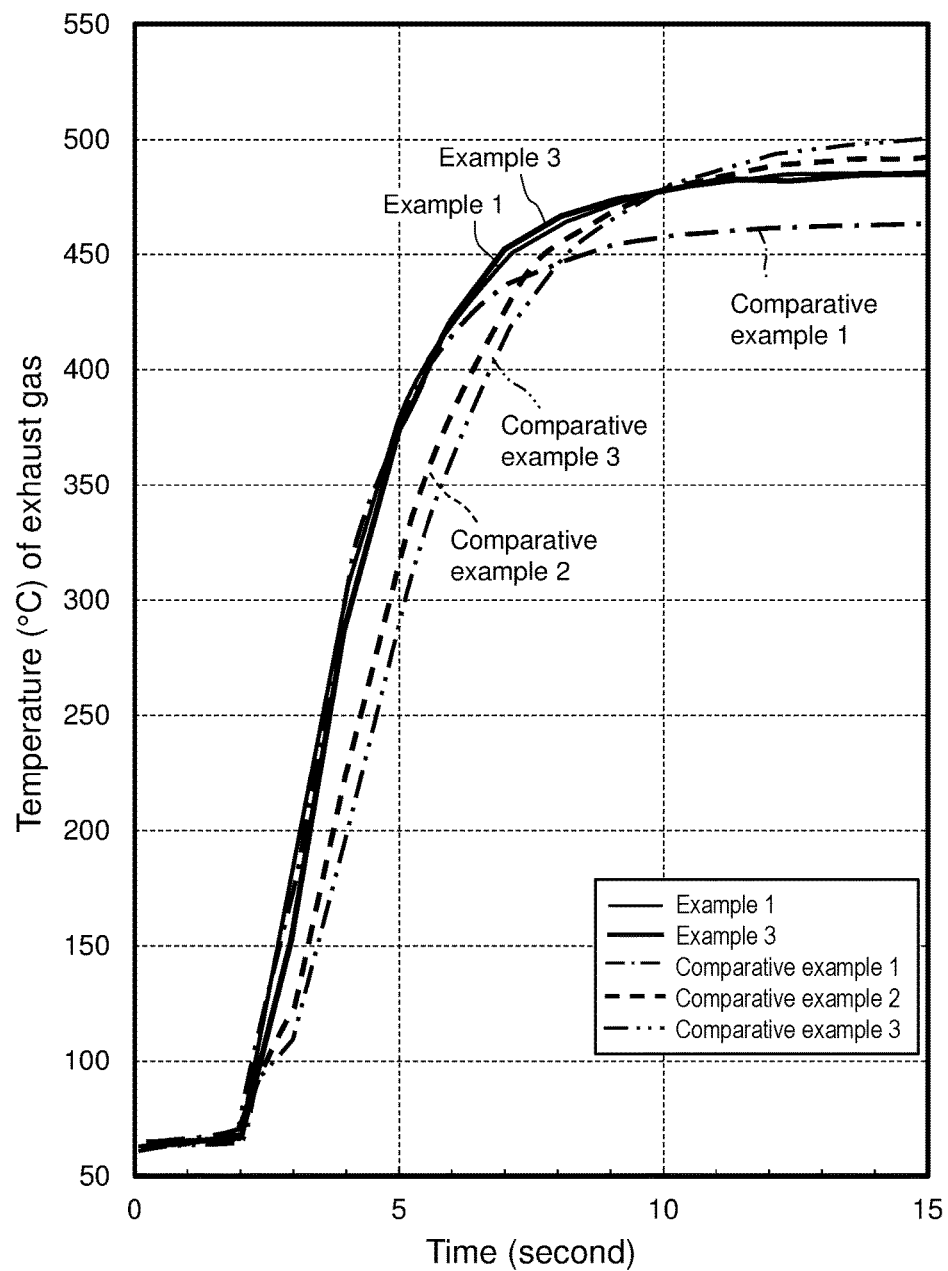
FIG. 9 is a graph illustrating the measurement of a change in the temperature of exhaust gas having passed through the first catalyst of each of Examples 1 and 3 and Comparative Examples 1 to 3.

Further, the temperature of the exhaust gas having passed through the first catalyst in the first catalytic converter of each of Example 1 and 3 Comparative Examples 1 to 3 after the flow channel was switched to the bypass pathway (after the engine was started) was measured. FIG. 9 illustrates the results. FIG. 9 is a graph illustrating the measurement of a change in the temperature of exhaust gas having passed through the first catalyst of each of Examples 1 and 3 and Comparative Examples 1 to 3.

[Result 1]

As illustrated in FIG. 7, the time to reach 50% purification of HC of the first catalytic converter of each of Examples 1 to 4 was shorter than that of Comparative Example 1. This is considered to be due to the reason that in Examples 1 to 4, purification efficiency was enhanced as the first catalyst was further arranged on the upstream side of the second catalyst unlike in Comparative Example 1.

However, as illustrated in FIG. 7, although the first catalyst was arranged on the upstream side of the second catalyst in each of Comparative Examples 2 and 3, the time to reach 50% purification of HC of the first catalytic converter was longer than that of Comparative Example 1. In addition, as illustrated in FIG. 9, the temperature of exhaust gas of each of Comparative Examples 2 and 3 after 2 to 7 seconds have elapsed from the time of starting the engine was lower than those of Examples 1 and 3.

In view of the foregoing, it is considered that since the heat capacity of the first catalyst of each of Comparative Examples 2 and 3 is higher than those of Examples 1 to 4, a great amount of heat of exhaust gas was taken away by the first catalyst while the exhaust gas was passing through the first catalyst in each of Comparative Examples 2 and 3. Accordingly, it is considered that since the temperature of exhaust gas reaching the second catalyst in the initial stage (2 to 7 seconds) from the time of starting the engine of each of Comparative Examples 2 and 3 was lower in than those of Examples 1 and 3, a temperature increase of the second catalyst due to the exhaust gas was slow. Consequently, it can be said that in each of Comparative Examples 2 and 3 in which the heat capacity of the first catalyst is lower than those of Examples 1 to 4, the time to reach 50% purification of HC of the first catalytic converter was longer as illustrated in FIG. 8.

Meanwhile, as illustrated in FIG. 9, the temperature of exhaust gas of each of Examples 1 and 3 is substantially equal to that of Comparative Example 1 until 6 seconds have elapsed from the time of starting the engine. This is considered to be due to the reason that since the heat capacity of the first catalyst of each of Examples 1 and 3 is lower than those of Comparative Examples 2 and 3, the amount of heat of exhaust gas taken away (absorbed) by the first catalyst was small, and thus the heat of reaction generated upon activation of the first catalyst was input to the exhaust gas. Therefore, it is considered that in the first catalytic converter of each of Examples 1 to 4, the temperature of the second catalyst can be increased in an early stage with little influence of absorption of heat of exhaust gas by the first catalyst. In addition, as illustrated in FIG. 9, after 6 seconds have elapsed from the time of starting the engine, the temperature of exhaust gas having passed through the first catalyst (that is, the temperature of exhaust gas to flow into the second catalyst) of each of Examples 1 and 3 is higher than that of Comparative Example 1 due to the activation of the first catalyst, and thus it can be said that the temperature of the second catalyst was increased more and the purification of exhaust gas by the second catalyst was promoted more.

From the aforementioned results, as illustrated in FIG. 8, it can be said that as long as the heat capacity of the first catalyst is less than or equal to 20 J/K under a temperature environment of 25° C., the second catalyst as well as the first catalyst can be activated in an early stage.

Example 5

A first catalytic converter was produced as in Example 1. First, a substrate with the shape illustrated in FIG. 5 was prepared as the substrate (metal substrate) of the first catalyst. Specifically, the substrate 34' of the first catalyst 34A was a disk-like substrate made of stainless steel (metal substrate) with an outside diameter of 80 mm, an inside diameter of 30 mm, and a length of 2 mm. The thickness of the ring-like metal frame (outer peripheral portion) 34a was 1.0 mm, and the thickness of the inner peripheral portion 34e was 30 μm. The thickness of each of the wave-like metal band 34b and the plate-like metal band 34c forming the first gas passage portion 34f was 30 μm, the number of cells (the number of pores) per square inch was 600, and the weight of the substrate was 11.0 g.

The substrate was coated with slurry containing a predetermined percentage of rhodium as in Example 1, and was then dried at 120° C. and baked at 500° C. Accordingly, a coat layer with a weight of 1.0 g was formed on the substrate, and the weight of rhodium therein was about 0.10 g. The heat capacity of the obtained first catalyst 34A was calculated from the weights of the substrate and the coat layer as in Example 1. Then, the heat capacity of the first catalyst 34A of Example 5 was found to be 6.6 J/K under a temperature environment of 25° C. The specific heat of stainless steel, which is a material of the substrate, is 0.46 J/g·K under a temperature environment of 25° C., and the specific heat of the baked ceria-zirconia contained in the coat layer is 1.5 J/g·K under a temperature environment of 25° C. Further, the proportion of the cross-sectional area of the exhaust gas flow channel of the second gas passage portion 34g to the total cross-sectional area of the cross-sectional area of the exhaust gas flow channel of the first gas passage portion 34f and the cross-sectional area of the exhaust gas flow channel of the second gas passage portion 34g (hereinafter referred to as the "area rate of the cavity portion") was 14%.

Example 6

A first catalytic converter was produced as in Example 5. Example 6 differs from Example 5 in that the inside diameter of the substrate 34' of the first catalyst 34A was set to 15 mm and the weight of the substrate was set to 11.4 g. Further, a coat layer with a weight of 1.2 g was formed on the substrate as in Example 5, and the weight of rhodium contained in the coat layer was about 0.11 g. The heat capacity of the obtained first catalyst 34A was calculated from the weights of the substrate and the coat layer as in Example 5. Then, the heat capacity of the first catalyst 34A of Example 6 was found to be 7.0 J/K under a temperature environment of 25° C. The area rate of the cavity portion was 3.5%.

Example 7

A first catalytic converter was produced as in Example 5. Example 7 differs from Example 5 in that the inside diameter of the substrate 34' of the first catalyst 34A was set to 40 mm and the weight of the substrate was set to 10.1 g. Further, a coat layer with a weight of 1.0 g was formed on the substrate as in Example 5, and the weight of rhodium contained in the coat layer was about 0.10 g. The heat capacity of the obtained first catalyst 34A was calculated from the weights of the substrate and the coat layer as in Example 5. Then, the heat capacity of the first catalyst 34A of Example 5 was found to be 6.2 J/K under a temperature environment of 25° C. The area rate of the cavity portion was 25%.

Comparative Example 4

A first catalytic converter was produced as in Example 5. Comparative Example 4 differs from Example 5 in that the first catalyst was not provided in the first catalytic converter. Therefore, the catalytic converter of Comparative Example 4 is the same as that of Comparative Example 1.

Comparative Example 5

A first catalytic converter was produced as in Example 5. Comparative Example 5 differs from Example 5 in that the first catalyst 34 without the cavity portion illustrated in FIG. 3 was used. Therefore, Comparative Example 5 is an example included in the present disclosure. The weight of the substrate of the first catalyst 34 of Comparative Example 5 was 11.6 g. Further, a coat layer was formed on the substrate as in Example 5, and the weight of rhodium contained in the coat layer of 1.2 g was about 0.11 g. The heat capacity of the obtained first catalyst 34 was calculated from the weights of the substrate and the coat layer as in Example 5. Then, the heat capacity of the first catalyst 34 of Comparative Example 5 was found to be 7.1 J/K under a temperature environment of 25° C.

Figure 10:
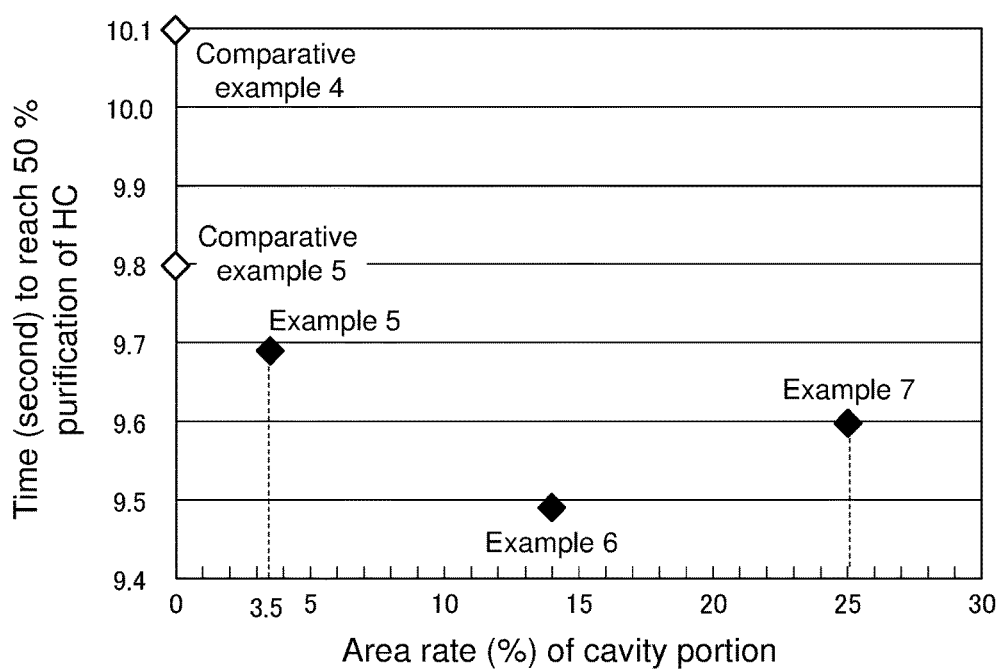
FIG. 10 is a graph illustrating the relationship between the area rate of a second gas passage portion in the first catalyst of each of Examples 5 to 7 and Comparative Examples 4 and 5 and the time to reach 50% purification of HC of exhaust gas having passed through the first catalytic converter.

An evaluation test similar to that in Example 1 was conducted on the first catalytic converter of each of Examples 5 to 7 and Comparative Examples 4 and 5, and the time until the purification efficiency of HC of exhaust gas discharged from the first catalytic converter reached 50% from the time of starting the engine was measured. FIG. 10 illustrates the results. FIG. 10 is a graph illustrating the relationship between the area rate of the second gas passage portion in the first catalyst of each of Examples 5 to 7 and Comparative Examples 4 and 5 and the time to reach 50% purification of HC of exhaust gas having passed through the first catalytic converter.

Figure 11:
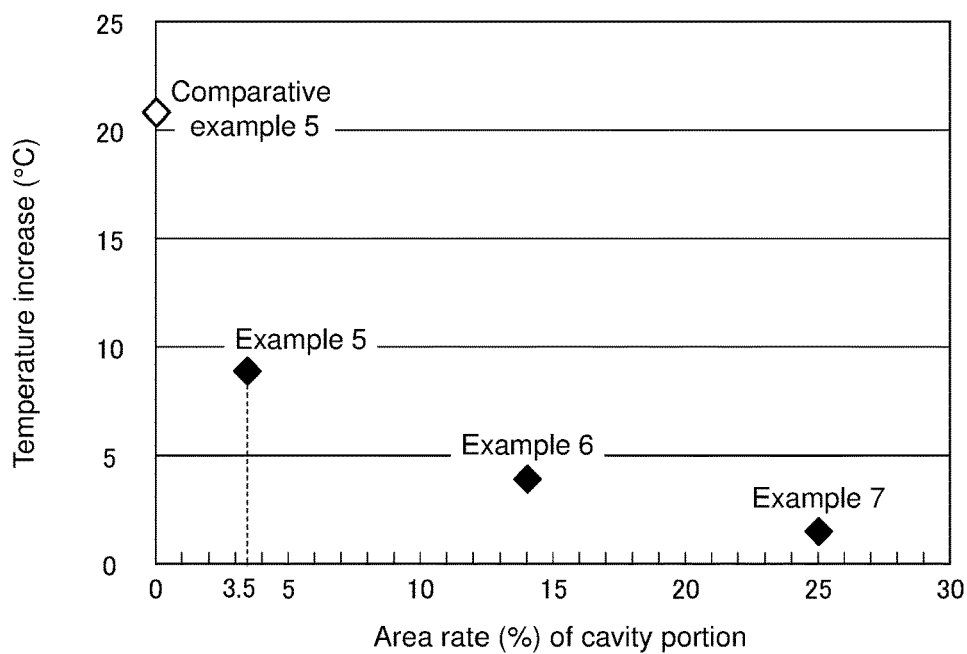
FIG. 11 is a graph illustrating the relationship between the area rate of a second gas passage portion in the first catalyst of each of Examples 5 to 7 and Comparative Example 5 and the temperature increase of the first catalyst.

Further, the temperature increase of the first catalyst of each of Examples 5 to 7 and Comparative Example 5 after 10 seconds have elapsed from the start of passing exhaust gas through the first catalyst was measured. FIG. 11 illustrates the results. FIG. 11 is a graph illustrating the relationship between the area rate of the second gas passage portion of the first catalyst of each of Examples 5 to 7 and Comparative Example 5 and the temperature increase of the first catalyst.

[Result 2]

As illustrated in FIG. 10, the time to reach 50% purification of HC of the first catalytic converter of each of Examples 5 to 7 and Comparative Example 5 was shorter than that of Comparative Example 4. This is considered to be due to the reason that in Examples 5 to 7 and Comparative Example 5, purification efficiency was enhanced as the first catalyst was further arranged on the upstream side of the second catalyst unlike in Comparative Example 4.

Further, the time to reach 50% purification of HC of the catalytic converter of each of Examples 5 to 7 was shorter than that of Comparative Example 5. This is considered to be due to the reason that in Examples 5 to 7, exhaust gas at a high flow velocity was able to be flowed into the central portion of the second catalyst via the second gas passage portion in a shorter time than that in Comparative Example 5. As described above, it is considered that exhaust gas having passed through the second gas passage portion of the first catalyst flowed toward the central portion of the second catalyst, and thus the temperature of the central portion of the second catalyst increased in an early stage, and the heat of the temperature increase was transmitted to the peripheral portion from the central portion. In addition, it is considered that such effect is expected to be obtained as long as the area rate of the cavity portion that is greater than or equal to 3.5% is ensured.

Further, as illustrated in FIG. 11, the temperature increase of the first catalyst of each of Examples 5 to 7 was smaller than that of Comparative Example 5. This is considered to be due to the reason that the flow rate of exhaust gas flowing through the first gas passage portion decreased with an increase in the area rate of the cavity portion. In addition, it is considered that the flow rate of exhaust gas flowing through the first gas passage portion can be ensured as long as the area rate of the cavity portion that is less than or equal to 25% is ensured, and thus the effect of increasing the temperature with the first catalyst can be expected.

Although the embodiment of the present disclosure has been described in detail above, the present disclosure is not limited thereto, and various design changes are possible within the spirit and scope of the present disclosure recited in the appended claims.

Although the first catalyst is arranged in the first catalytic converter in this embodiment, the first catalyst may be provided on a further upstream side of the first catalytic converter as long as the condition of the heat capacity of the first catalyst is satisfied and exhaust gas with a higher temperature can be flowed through the second catalyst through the activation of the first catalyst, for example.

DESCRIPTION OF SYMBOLS

2 Engine
29 Exhaust manifold
3 Exhaust gas purifying apparatus
30 First catalytic converter (catalytic converter)
32 Exhaust gas purifying catalyst
33 Housing
33a Inlet-side cone portion
33b Body portion
33c Outlet-side cone portion
34, 34A, 34B, 34C First catalysts
34a Metal frame (outer peripheral portion)
34e Inner peripheral portion
34f First gas passage portion
34g Second gas passage portion
34h Cells (pores)
35 Second catalyst

What is claimed is:

1. An exhaust gas purifying apparatus comprising an exhaust gas purifying catalyst adapted to purify exhaust gas from an exhaust manifold,
wherein:
the exhaust gas purifying catalyst includes a first catalyst and a second catalyst, the first catalyst being adapted to purify exhaust gas from the exhaust manifold, and the second catalyst being adapted to purify the exhaust gas having passed through the first catalyst,
heat capacity of the first catalyst is lower than that of the second catalyst,
the heat capacity of the second catalyst is 184 to 322 J/K under a temperature environment of 25° C., and
the heat capacity of the first catalyst is less than or equal to 20 J/K under a temperature environment of 25° C.

2. The exhaust gas purifying apparatus according to claim 1, further comprising a catalytic converter, the catalytic converter including the first and second catalysts and a meal housing storing the first and second catalysts therein,
the housing has
an inlet-side cone portion adapted to allow exhaust gas from the exhaust manifold to flow thereinto and having an exhaust gas flow channel with a cross-section that becomes larger from an upstream side toward a downstream side of the exhaust gas,
a body portion continuous with the inlet-side cone portion and having an exhaust gas flow channel with a constant cross-section, and
an outlet-side cone portion continuous with the body portion and having an exhaust gas flow channel with a cross-section that becomes smaller from an upstream side toward a downstream side of exhaust gas,
the first catalyst is arranged in the inlet-side cone portion, and
the second catalyst is arranged in the body portion.

3. The exhaust gas purifying apparatus according to claim 1, wherein the first catalyst includes a substrate made of a metal material and metal catalysts supported on the substrate, the metal catalysts being adapted to purify exhaust gas.

4. The exhaust gas purifying apparatus according to claim 3,
wherein:
the substrate has a disk-like shape, and includes
an outer peripheral portion,
an inner peripheral portion formed on an inner side of the outer peripheral portion,
a first gas passage portion having a plurality of pores formed between the outer peripheral portion and the inner peripheral portion along an exhaust gas flow direction, a wall surface forming each pore being adapted to have the metal catalysts supported thereon, and
a second gas passage portion that is a cavity portion formed on an inner side of the inner peripheral portion along the exhaust gas flow direction, and
a proportion of a cross-sectional area of an exhaust gas flow channel of the second gas passage portion to a total cross-sectional area of a cross-sectional area of an exhaust gas flow channel of the first gas passage portion and the cross-sectional area of the exhaust gas flow channel of the second gas passage portion is 3.5 to 25%.

* * * * *